G. L. JOSS.
AIR DISTRIBUTING NOZZLE FOR AIR LIFTS.
APPLICATION FILED MAY 26, 1908.
955,409.
Patented Apr. 19, 1910.
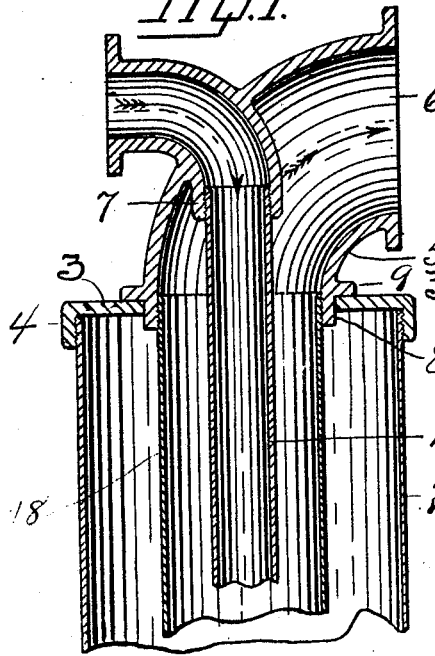
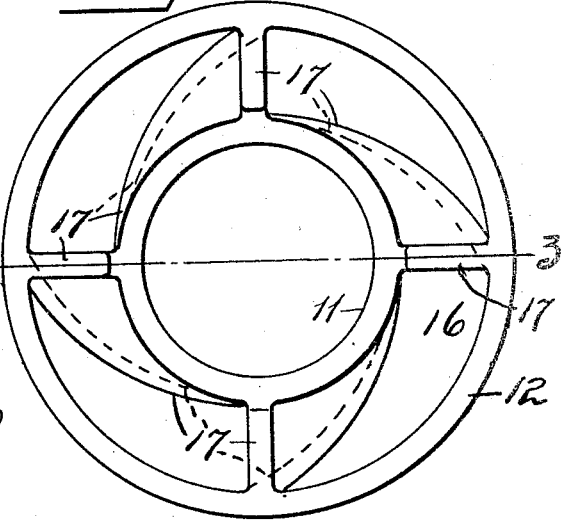
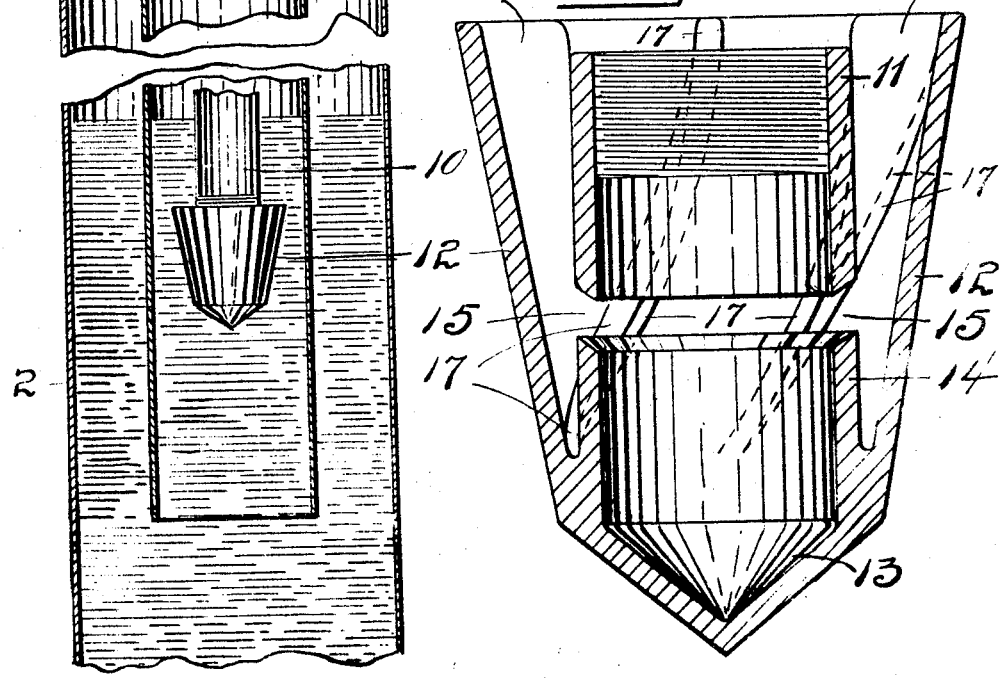
Witnesses.
Lincoln Nelson.
Inventor,
George L. Joss,
By H. W. Richards,
Attorney.

UNITED STATES PATENT OFFICE.

GEORGE L. JOSS, OF MONMOUTH, ILLINOIS.

AIR-DISTRIBUTING NOZZLE FOR AIR-LIFTS.

955,409. Specification of Letters Patent. Patented Apr. 19, 1910.

Application filed May 26, 1908. Serial No. 435,170.

*To all whom it may concern:*

Be it known that I, GEORGE L. JOSS, a citizen of the United States, and a resident of Monmouth, in the county of Warren and State of Illinois, have invented a new and useful Air-Distributing Nozzle for Air-Lifts, of which the following is a specification.

The invention relates to means for raising water from deep wells by means of air under pressure.

It may here be stated that the device is adapted for use in connection with either water or oil wells.

Heretofore water and other liquids have been lifted by the action of jets of air under pressure directed upwardly from the lower end of an induction tube or pipe with varying degrees of success, and it is to this mode or system of elevating liquids that my invention has primary relation. And while I have in the accompanying drawings shown, and shall in this specification describe a specific construction with which my improvements may be embodied, I do not desire to be understood as limiting my claims to such, nor to any certain details.

In the class or character of air-lift apparatus above referred to difficulty has been experienced because of the fact that the air was in such manner introduced into the eduction from the induction pipe that the water contained in the former was of necessity raised bodily and directly upward. Moreover, the water and the air were alternately discharged from the outlet or discharge end of the pipe in the same manner as that in which they were admitted, that is to say, in jets. This created a great strain on the pumps; it necessitated also the consumption of a great amount of fuel.

The principal objects of my invention are, therefore, threefold, to wit; first; to produce a device by the employment of which the water will be discharged in a constantly flowing and steady stream from the eduction pipe; second; to relieve the pumps from such strain as has just been related, and: third; to subserve economy in fuel.

Other objects of the invention will be in part obvious and in part pointed out.

The structural features, arrangement, connection and mutual relationship of the parts of my improvement, and a preferred construction of well-casing and an eduction pipe with which said improvements are incorporated, are illustrated in the accompanying drawings, in which:

Figure 1 is a vertical central sectional view, partly in elevation and partly broken away, of a well equipped with my improvements; Fig. 2, a top plan of an air distributing nozzle embodying my improvements; and Fig. 3, a vertical section in the line 3—3 in Fig. 2.

In the drawings I have shown a well of comparatively great diameter. In such wells I employ an eduction pipe as shown, but in ordinary wells, say from six to ten inches in diameter, the eduction pipe is dispensed with, the well-casing serving the same purpose.

Prefatorily it may be stated that the air discharged from the depending end of the air pipe (or induction pipe) is forced directly downward into the conical bottom of the nozzle, which returns it in a reverse direction, or upwardly. As it passes in the last named direction, being unable to counteract the force of the descending current, it will be forced outwardly through ports presently described, thence through spirally disposed deflectors, and outwardly about the pipe (of less diameter than the nozzle), to commingle with and force upward the water, to and through the eduction pipe or the well-casing, as the case may be.

Referring to the drawing by numerals, the same one indicating the same part in the different figures, 2 indicates a well-casing, which may be of any suitable and desired construction, no attention having been paid in the drawing thereof as to proportion or detail. It is provided with the usual curb 3, shown here as provided with an annular flange 4 threaded onto the casing, and provided also with a centrally disposed aperture for the reception of the curved or bent member 5 of the combined induction and eduction spout. This latter comprises a discharge end 6, an air inlet 7 leading thereinto, and a depending end 8 above which is arranged an annular shoulder 9 which is adapted to rest on the curb 3 about its central orifice. In wells of large diameter I employ a pipe 18 fixed to and depending from the lower end 8 of the eduction pipe as shown. In wells of small diameter the pipe 18 is dispensed with. Any preferred and suitable means (not shown) of forming a hermetic union of these parts may be employed.

Threaded into the lower end of the air inlet 7 is an ordinary induction or injection pipe 10, the lower end of which is threaded for engagement with the threaded ring 11 of my improved air distributing nozzle, which latter it supports. The nozzle comprises a shell or casing 12 which is preferably conical or sub-conical as shown, although it may be of another contour, and its bottom 13 also is preferably conical in order to avoid frictional contact of the air. The nozzle comprises also an annular rising member 14 coinciding with and disposed immediately beneath the threaded ring 11 above referred to, and these annular members are spaced apart as shown at 15, to form ports communicating with the expansion chamber 16 created by the shell and the annular members recited.

I have hereinbefore referred to the fact that heretofore the air has been applied to the water in successive charges or jets immediately therebeneath, and that it was applied in such manner that the water was elevated in a vertical line and bodily. The gist and essence of my invention lies in overcoming this objectionable feature, and this I have successfully accomplished by the use of spirally oblique vanes or deflecting plates 17 shown at Figs. 2 and 3. These are preferably curved *per se* as well as arranged in a spiral series, and extend substantially from the top to the bottom of the chamber 16, or throughout its depth, and are preferably integral with the shell and the annular members 11 and 14, the upper one of which it supports. I have shown the lower end or extremity of each of the deflectors 17 as "cutting" a vertical line drawn from the proximal upper edge or corner of the next adjacent one in rear thereof, and have found in practice that such is the most successful construction. However, a lesser degree of curvature or of divergence than that shown may be employed if desired, and effective results will still be produced.

In operation I prefer that the nozzle be submerged in the liquid some distance below its "low-water" level. The device has been used with great success in a well approximately 1200 feet in depth. Within the casing of the well is a pipe 18, about 650 feet in length and having a normal submergence of 570 feet, the water level (when the pump is not working) being 80 feet from the curb. The air distributing nozzle is about 580 feet below the curb, and has therefore a normal submergence of approximately 500 feet. While a less submergence would doubtless be accompanied with equally as good if not superior results, yet the submergence must necessarily be sufficient that the air will not "blow" up through the water instead of commingling therewith. Air under pressure being directed through the opening 18 from the compressor will be forced downwardly through the induction pipe 10 and through the annulus 11 to the conical (or other) bottom of the shell. Seeking an opening it will be diverted outwardly through the ports 15 and forced upwardly into the chamber 16, where the deflecting plates will direct it and thereby the liquid in a spiral column and with a cyclonic or rotary motion. The liquid, or the charges thereof instituted by the periodic and successive impulses of compressed air, will to some extent mix with the latter and the liquid will flow from the discharge spout in a constant and steady stream.

While heretofore much back pressure has been exerted on the operating mechanism, which has caused its quickly becoming disabled and inoperative, because of the racking and jerking movements to which it has been subjected, the employment of my improvements obviates this and the machinery will run in a steady, even and uniform manner. Moreover, I have found by actual use in a large water-works system that the pumps would produce, when running at eighty strokes per minute, with my improvements, an amount of water formerly produced by the same pumps running at a speed of fifty per cent. higher (120 strokes per minute), another, but well known and standard type of air distributing nozzle having been then used. It will be clear without further remarks that a saving of one-third of the fuel is thus effected; and it will be also evident that an amount of fuel equal to that formerly used will produce a quantity of liquid about one-third greater than has been produced by former devices.

Any other fluid than that hereinabove described may be used if deemed expedient.

Having thus set forth the construction and operation, the purposes and advantages of my invention, I claim as my invention and desire to secure by Letters-Patent the following, to-wit:—

1. An air distributing nozzle comprising a shell, an annulus disposed therein, an annulus wholly within and rising from the bottom of said shell, said elements forming a chamber, and said annuli spaced apart whereby there is means of communication between their central openings and said chamber, and deflecting plates arranged in said chamber and extending throughout its length.

2. An air distributing nozzle comprising a shell, axially alined spaced members therein integral therewith forming a central chamber having ports, whereby communication is established between said chamber and one formed by said shell and the peripheries of said spaced members, and deflecting means disposed within the last recited chamber and extending throughout its length.

3. An air distributing nozzle comprising a conical shell, an annulus disposed at the upper portion thereof, and an annulus at the lower portion thereof, whereby a space is provided between the annuli and communication is established between them and the shell.

4. An air distributing nozzle comprising a conical shell, an annulus disposed at the upper portion thereof, an annulus at the lower portion thereof, whereby a space is provided between the annuli and communication is established between them and the shell, and deflectors arranged between said annuli and shell.

5. An air distributing nozzle comprising a conical shell, an annulus disposed at the upper portion thereof, an annulus at the lower portion thereof, whereby a space is provided between the annuli and communication is established between them and the shell, and spirally disposed deflectors between said annuli and shell.

6. The combination with a tube wherein they are suspended, of an induction pipe and an air distributing nozzle suspended therefrom, said nozzle comprising a shell of greater diameter than said pipe, a centrally disposed annular portion unitable to said pipe, a second annular member axially alined with the one first recited, providing a port, and deflectors arranged within the shell exterior to said annuli.

7. In an aerated-column water-lift, in combination, a well-pipe, an air-injection pipe inserted therein, and a plurality of expanding and spirally oblique expansion conduits rising from the outlet of said air-pipe, whereby a cyclonic motion is imparted to the expanding air as it enters the water column, substantially as specified.

8. In an aerated-column water-lift, in combination, a well-pipe, an air-injection pipe inserted therein, and an inverted sub-conical expansion-chamber subdivided by a plurality of spirally oblique vanes forming expansion conduits rising from the outlet of said air-pipe, whereby a cyclonic motion is imparted to the expanding air as it enters the water column, substantially as specified.

9. In an aerated-column water-lift, in combination, a well-pipe, an air-injection pipe inserted therein, and an inverted sub-conical expansion-chamber rising around the lower end of said air-pipe and sub-divided by a plurality of spirally oblique vanes forming outwardly enlarging conduits rising from the outlet of said air-pipe, whereby a cyclonic motion is imparted to the expanding air as it enters the water column, substantially as specified.

10. In an aerated-column water-lift, in combination, a well-pipe, an air-injection pipe inserted therein, and an inverted sub-conical expansion chamber rising around the lower end of said air-pipe and secured thereto by a plurality of spirally oblique vanes subdividing said chamber into outwardly enlarging expansion conduits rising from the outlet of said air pipe, whereby a cyclonic motion is imparted to the expanding air as it enters the water column, substantially as specified.

11. In an aerated-column water-lift, in combination, a well-pipe, an air injection pipe inserted therein and having a sub-conical nozzle at its lower end, and an inverted sub-conical expansion-chamber rising around said nozzle and secured thereto by a plurality of spirally oblique vanes subdividing said chamber into outwardly enlarging conduits rising from the orifice of said nozzle, whereby a cyclonic motion is imparted to the expanding air as it enters the water column, substantially as specified.

In witness whereof I have hereunto signed my name at Monmouth, Warren county, Illinois, this 20th day of May, 1908.

GEORGE L. JOSS.

Witnesses:
 GEO. H. BURNS,
 H. M. RICHARDS.